(12) United States Patent
Tatara et al.

(10) Patent No.: US 8,211,257 B2
(45) Date of Patent: Jul. 3, 2012

(54) TIRE BUILDING METHOD AND ROTATIONAL TRANSFER DEVICE FOR DRUM TRANSFER SUPPORT BASE IN TIRE BUILDING PROCESS

(75) Inventors: Tetsuo Tatara, Osaka (JP); Tomoyuki Takatsuka, Osaka (JP); Hirokatsu Mizukusa, Osaka (JP); Osamu Fujiki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1143 days.

(21) Appl. No.: 11/993,282

(22) PCT Filed: Jun. 22, 2005

(86) PCT No.: PCT/JP2005/011430
§ 371 (c)(1),
(2), (4) Date: Feb. 14, 2008

(87) PCT Pub. No.: WO2006/137131
PCT Pub. Date: Dec. 28, 2006

(65) Prior Publication Data
US 2009/0032175 A1   Feb. 5, 2009

(51) Int. Cl.
*B29D 30/08* (2006.01)
(52) U.S. Cl. ........................................ 156/111
(58) Field of Classification Search .......... 156/111, 156/396
See application file for complete search history.

(56) References Cited

U.S. PATENT DOCUMENTS 3,223,573 A * 12/1965 Deist ............................ 156/396
5,554,242 A     9/1996 Brown et al.

FOREIGN PATENT DOCUMENTS

| JP | 06-51367 | 7/1994 |
| JP | 09-029858 | 2/1997 |
| JP | 2002-178415 | 6/2002 |
| JP | 2002-205512 | 7/2002 |

* cited by examiner

*Primary Examiner* — Michael Tolin
(74) *Attorney, Agent, or Firm* — Fish & Richardson P.C.

(57) ABSTRACT

The invention can perform building in a process for building a carcass band or a belt/tread band of a tire, in which two drum transfer support bases (10) supporting building drums (D1) are alternately shifted to first and second transfer sections (11), (12), in which predetermined building positions are set, a rotational transfer device (A) for rotational transfer of the drum transfer support bases (10) is mounted between the first transfer section (11) and the second transfer section (12), which are arranged to get out of position relative to and in parallel to each other, and two pairs of rotational transfer rails (27a), (28a) are juxtaposed on a rotating table (20), which has an axis (O) intermediate between the both transfer sections, to be positioned corresponding to extensions of travel rails (11a), (12a) arranged on the first and second transfer sections (11), (12) to receive two drum transfer support bases (10), (10), which enter from portions of the rails (11a), (12a) of the both transfer sections (11), (12), to have the same rotationally transferring to the other transfer section (12) or (11) at the same time.

2 Claims, 11 Drawing Sheets

F I G. 1
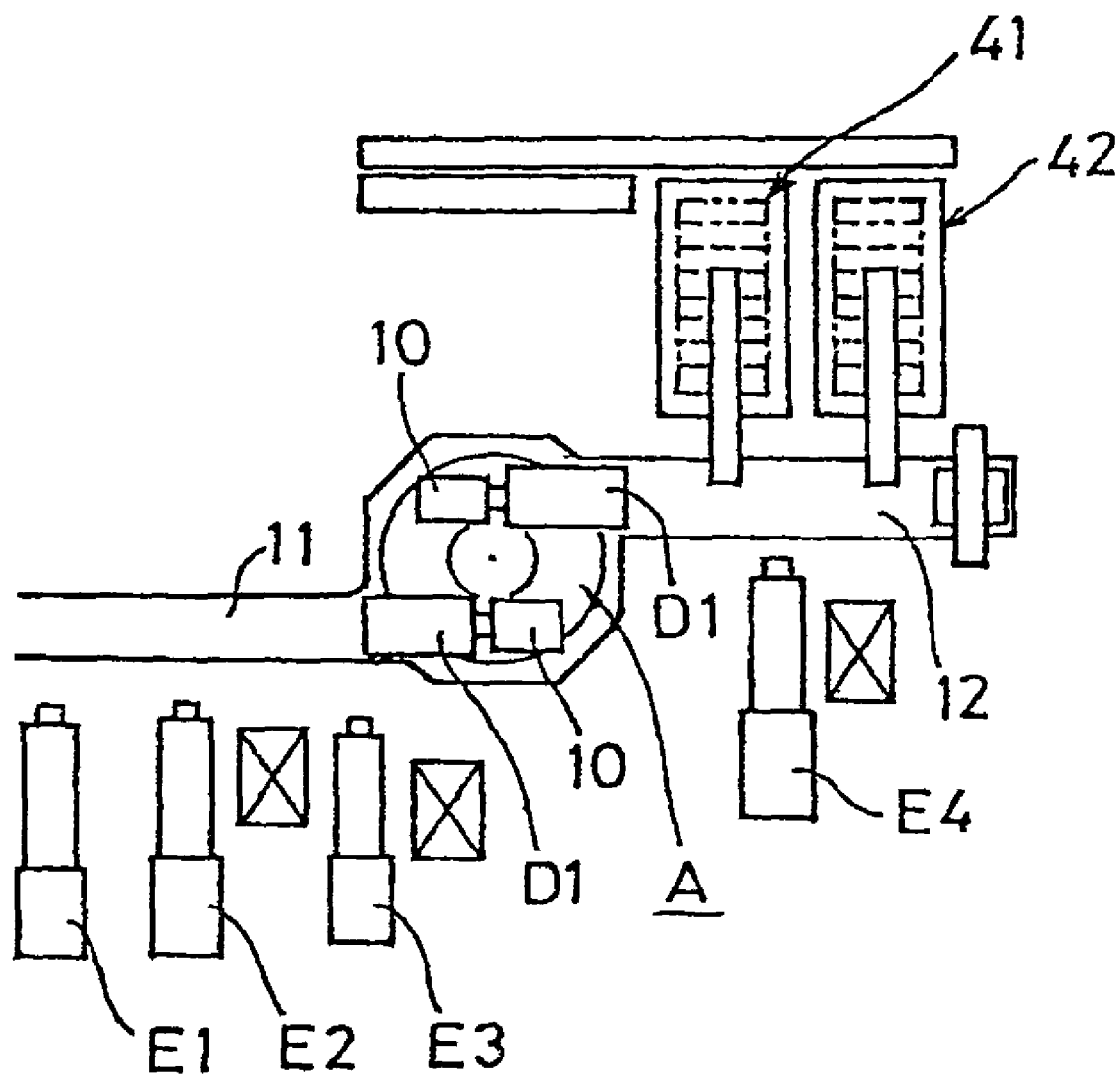

F I G. 12
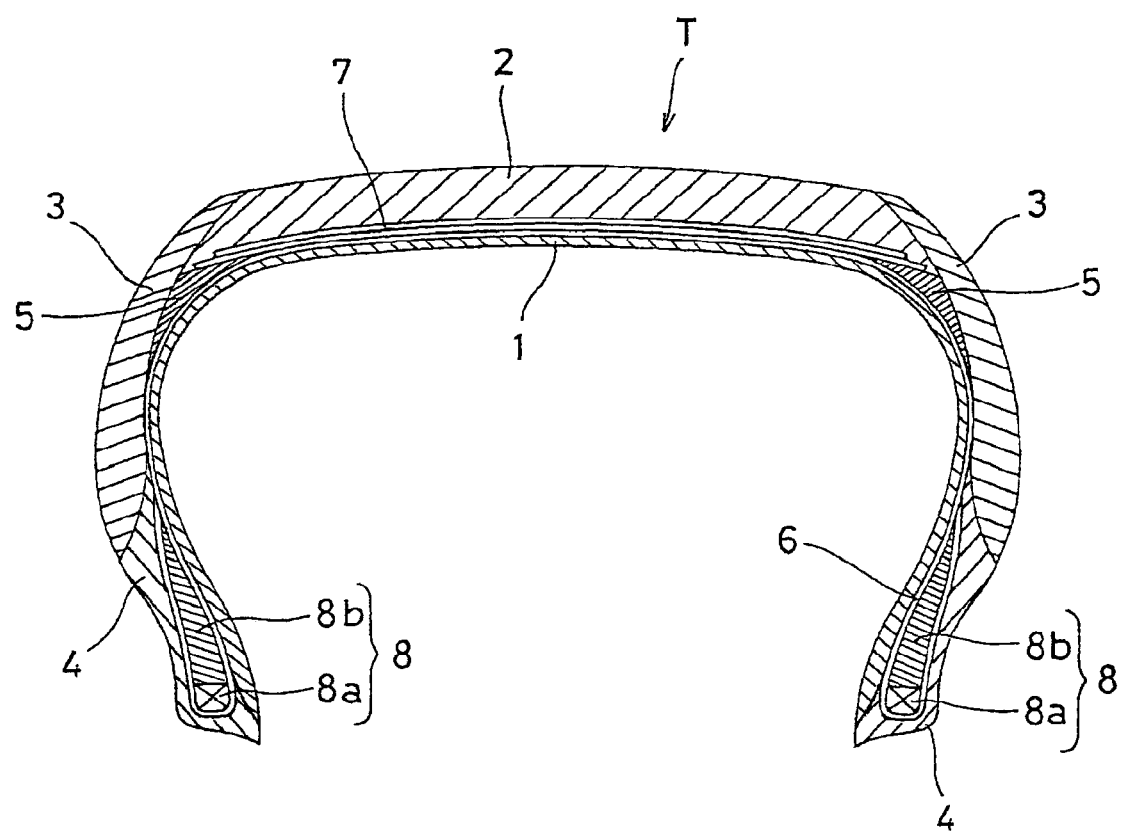

TIRE BUILDING METHOD AND ROTATIONAL TRANSFER DEVICE FOR DRUM TRANSFER SUPPORT BASE IN TIRE BUILDING PROCESS

TECHNICAL FIELD

The present invention relates to a tire building method using two drum transfer support bases each supporting a building drum in a part of a process of tire building and a rotational transfer device for alternately transferring the two drum transfer support bases to first and second transfer sections.

BACKGROUND ART

A tire is structured to include a plurality of rubber members and a plurality of reinforcement members, of which a main material comprises cord. Typically, as shown in FIG. 12, respective parts such as an inner liner 1, a tread 2, side walls 3, rim strips or chafers 4, belt under pads 5, etc. are formed of rubber members conformed to demanded properties and these rubber members are combined with a carcass layer 6, a belt layer 7, a bead body 8, etc., which comprise reinforcement members including cords, to form a tire T. FIG. 11 shows an example of respective constituent members of the tire in an exploded manner.

As shown in FIG. 11, the tread 2 comprises a tread base 2a and a tread cap 2b. Also, the carcass layer 6 comprises first and second carcass plies 6a, 6b and the belt layer 7 comprises a plurality of belts 7a, 7b. The bead body 8 comprises a bead core 8a made of wire or the like, and a filler rubber 8b. The reference numeral 1a in the figure denotes a rubber layer called squeeze and laminated on the inner liner, 6c a ply intermediate tape, and 7c a belt edge tape, both of which comprise a rubber member. The reference numeral 9 denotes a fiber cord filled reinforcement tape wound round the belt layer 7.

Conventionally, there is known as a method of building a tire, which is structured as described above, a two-stage building method of sticking an inner liner, a carcass ply, etc. on a first building drum, which can expand and contract, to build a bead and side walls to make a green case, then transferring the green case to a secondary building drum for having to deform the green case in a troidal shape, and sticking a belt, tread rubber, etc. on the green case to build a green tire.

By the way, in a primary building process and a secondary building process in the two-stage building method, building performed by sticking tire constituent members in one building position in the respective processes leads to lengthening of a building cycle time, which is an obstacle to an improvement in productivity.

In recent years, there has been proposed a system, in which building positions are set respectively and separately every tire constituent member and a building drum or a built body itself built on the building drum is transferred to the respective building positions to permit a predetermined constituent member to be wound round and laminated on the building drum to build a green tire before curing. Further, when respective rubber members such as an inner liner, a tread, etc., or respective reinforcement members such as a carcass layer, a belt layer, etc. are beforehand manufactured in a separate preparation from a tire building process, there is needed a lot of stock, an improvement in productivity cannot be expected, and there is a need for a vast factory space, so that it has been proposed to perform building by spirally overlapping and winding non-cured rubber strips extruded in a ribbon-shaped manner in respective building positions, for example, for respective rubber members according to a tire being built (Patent Documents 1 to 4).

Even in the case where rubber members, which constitute a tire, are built by winding of rubber strips as described above, however, amounts of rubber are considerably varied depending upon the rubber members such that, for example, rubber members such as tread, side walls, etc. are relatively large in volume, a belt under pad, a chafer, etc. are relatively small in rubber volume, and so the larger in rubber volume the rubber members, the longer time required for winding.

Accordingly, in building of a tire, the arrangement of positions for building of the respective rubber members becomes an important factor in relation to time required for winding and building thereof, loss in building cycle time is generated with an ununiform arrangement in respective processes.

Hereupon, the inventors of the present application have thought building respective rubber members by winding of rubber strips as described above, dividing a process of building a cylindrical-shaped carcass band composed of rubber members such as an inner liner, etc. and a carcass ply, a process of subsequently performing bead set, turnup, or the like to build a cylindrical-shaped green case, a process of building a cylindrical-shaped belt/tread band composed of a belt and tread rubber, and a process of uniting the green case and the belt/tread band together to build the same into a final shape, into four building stages, and performing building of respective steps in respective building stages in parallel.

By the way, in building of the carcass band in the building stages, in the case where one building drum is used and rubber members such as an inner liner, a chafer, and a squeeze and respective members such as first and second carcass plies, etc. are wound and built while the building drum is transferred to respective building positions, subsequent building cannot be performed until the built body is conveyed to a subsequent process, so that a building cycle time in the building stages is lengthened and an improvement in efficiency of building cannot be expected.

Also, in building of a belt/tread band in the building stages, in the case where respective members for winding of first and second belts and a reinforcement tape on the belt, for winding of a tread base, which constitutes tread rubber, and rubber strips of a tread cap, and the like are wound and built while the drum is transferred to respective building positions, building cannot be performed until transfer in a subsequent process, so that a building cycle time in the building stages is lengthened and an improvement in efficiency of building cannot be expected. Also, in the case where respective building positions are aligned along transfer sections, to which the building drum is transferred, a total length is lengthened, so that there is a need for a large installation space and transfer to a subsequent process also becomes low in efficiency.

Patent Documents 1: JP-B-6-51367
Patent Documents 2: JP-A-9-29858
Patent Documents 3: JP-A-2002-178415
Patent Documents 4: JP-A-2002-205512

DISCLOSURE OF THE INVENTION

Problems that the Invention is to Solve

In order to solve the problem described above, the invention achieves shortening of a building time and an improvement in efficiency of building by the medium of dividing respective building positions in a part of a tire building process, such as a process of building the carcass band, or a process of building the belt/tread band, into two building positions, that is, a building position along a first transfer section and a building position along a second transfer section, and using two building drums to perform building on the both drums at the same time while the both building drums are alternately transferred to the first transfer section and the second transfer section.

In this case, it is required that two drum transfer support bases, respectively, supporting the building drums be alternately shifted to the first transfer section and the second transfer section, and so it is necessary to simply and readily perform such shift.

The invention provides a tire building method of alternately shifting two drum transfer support bases, respectively, which support building drums, to first and second transfer sections, in which predetermined building positions are set, to perform building, and a rotational transfer device, by which the method is readily carried out.

Means for Solving the Problems

The invention has a feature in that in a part of a process of tire building, a tire building method, in which a first transfer section and a second transfer section each setting a building position for a predetermined tire constituent member are divided and the both transfer sections are arranged with a rotational transfer device therebetween, comprises using two drum transfer support bases each supporting a building drum rotatably, and alternately changing the two drum transfer support bases in direction to transfer the same to the first transfer section and the second transfer section through the rotational transfer device to sequentially transfer the both building drums to respective building positions of the first and second transfer sections to laminate and build the respective tire constituent members. Thereby, it is possible to shorten a building cycle time to achieve an improvement in efficiency of building.

Further, the invention has a feature in that in a tire building process, a rotational transfer device is mounted between a first transfer section and a second transfer section each provided with a travel rail, on which a drum transfer support base supporting a building drum rotatably is transferred to a predetermined building position to cause the drum transfer support bases to rotationally transfer to one of the first and second transfer sections to the other and change in direction, the rotational transfer device includes a rotating table having an axis intermediate between the first transfer section and the second transfer section, which are provided in parallel to each other on both sides with the rotational transfer device therebetween to get out of position relative to each other, and two pairs of rails for rotational transfer are juxtaposed on the rotating table with the axis therebetween to be positioned corresponding to extensions of travel rails of the first and second transfer sections in a rotation stopped state to receive two drum transfer support bases, each of which enters from the rail of the first or second transfer section, to enable the same to rotationally transfer to the other transfer section at the same time. Preferably, the rotating table is controlled to alternately rotate forward and backward 180° by 180°.

The rotational transfer device enables two drum transfer support bases to sequentially alternately change in direction to transfer to the first transfer section and the second transfer section, in each of which a predetermined building position is set, thus enabling winding and building respective tire constituent members in the respective building position of the first transfer section and the second transfer section. Also, in the case where a build body is taken out from one of the building drums to be transferred to a subsequent process, a tire constituent member can be wound round and built on the other of the building drums. Therefore, it is possible to favorably carry out the tire building method, thus enabling an improvement in efficiency of tire building.

Also, the rotating table is alternately rotated forward and backward 180° by 180° whereby a cable can be connected to the building drums and the drum transfer support bases without causing a problem. Therefore, it is unnecessary to adopt an expensive data transmission system such as light transmission and infrared ray transmission. Besides, a high level control (synchronous-tuning operation, etc.) required for sticking with accuracy is made possible. That is, while the communication method described above involves a fear that time lag and failure of partial transmission of data are caused, the cable is connected to enable control without causing a problem of the failure of transmission described above.

Preferably, with the rotational transfer device, the rotating table is supported rotatably in a horizontal state with a guide, which is provided on an underside thereof, fitting on an annulus rail mounted on a machine base, the rotating table being provided so as to be rotationally driven through a power transmission mechanism connected to drive means, whereby it is possible to rotate the rotating table without getting out of position, thus enabling the drum transfer support bases on the rotating table to surely rotationally transfer to the other transfer sections and to change in direction.

Preferably, with the rotational transfer device, racks are provided along the two rails juxtaposed on the rotating table to be positioned corresponding to extensions of racks extending along the rails of the first and second transfer sections, respectively, and gears provided on the drum transfer support bases are rotationally driven in a state of meshing with the respective racks whereby the drum transfer support bases are self-propelled.

Also, a rotation restricting member is preferably provided on the machine base outside the rotating table to project toward and engage with an engagement provided on an outer periphery of the rotating table when rotation of the rotating table is stopped. Thereby, it is possible to surely register the respective travel rails of the first transfer section and the second transfer section with two pairs of rails on the rotating table and to smoothly move the drum transfer support bases without generation of play when they are received or forwarded.

Preferably, stopper pins are provided in the vicinity of the two rails juxtaposed on the rotating table to freely project upward so as to be fitted into engagement holes provided on lower base plates of the drum transfer support bases having entered onto the respective rails, whereby the drum transfer support bases received onto the rotating table can be held stably in predetermined positions and the drum transfer support bases do not move arbitrarily at the time of rotational transfer.

In a process, in which a cylindrical-shaped carcass band is built, the rotational transfer device can be mounted between the first transfer section, in which a plurality of building positions for winding and laminating of rubber members such as an inner liner, a chafer, a squeeze, etc. are set, and the second transfer section, in which a plurality of building positions including a position for winding and laminating of carcass ply composed of a plurality of layers are set. In this case, it is possible to shorten a building cycle time of the carcass band, thus enabling contributing to an improvement in efficiency of tire building.

Also, in a process, in which a cylindrical-shaped belt/tread band is built, the rotational transfer device can be mounted between the first transfer section, in which a plurality of building positions including a position for winding and laminating of a belt member composed of a plurality of layers are set, and the second transfer section, in which a building position for winding and laminating of a rubber member for formation of tread rubber is set. In this case, it is possible to shorten a building cycle time of the carcass/tread band, thus enabling contributing to an improvement in efficiency of tire building.

Effect of the Invention

With the tire building method of the invention and the rotational transfer device using the same, building can be performed by rotationally transferring one of two drum transfer support bases, each of which supports a building drum in the tire building process, to the second transfer section from the first transfer section and the other to the first transfer section from the second transfer section so as to change the same in direction at the same time, so that respective tire constituent members can be wound round and built on the respective building drums in the first and second transfer sections, thus enabling shortening a building cycle time and achieving an improvement in efficiency of building.

Best Mode for Carrying out the Invention

Subsequently, a mode for carrying out the invention will be described on the basis of an embodiment shown in the drawings.

FIG. 1 schematically shows a part of a tire building process, in which a rotational transfer device for a drum transfer support base according to the invention is provided.

The process in FIG. 1 is a band building process for building of, for example, a cylindrical-shaped carcass band. The band building process is performed so that a first transfer section 11 and a second transfer section 12, in which building positions for predetermined tire constituent members are set, are divided, a rotational transfer device A is arranged between the both transfer sections 11 and two drum transfer support bases 10, which support a first building drum D1, are alternately shifted to the both transfer sections 11, 12.

The reference numerals E1, E2, E3 denote extruders for rubber strips, which form an inner liner, a chafer, and a squeeze, which are rubber members, 41, 42 services for first and second carcass plies, and E4 an extruder for rubber strips, which form a ply intermediate tape, whereby building positions are set for winding respective members (tire constituent members) round building drums to laminate the same. In addition, building positions, in which rubber members such as the inner liner, the chafer, the squeeze, or the ply intermediate tape, etc. are wound and laminated, are not limited to ones by winding of rubber strips but a wide rubber member formed into a predetermined cross sectional shape, which is the same as in a conventional art, is stuck and laminated in some cases.

The rotational transfer device A, according to the invention, together with the drum transfer support bases 10, which are to be transferred, will be described below in detail.

In the band building process in FIG. 1, there are provided the first transfer section 11 for transferring a support base, that is, the drum transfer support base 10, by which the building drum D1 including a peripheral surface having a larger width than that of a carcass layer (the reference numeral 6 in FIG. 11) being build and composed of a plurality of peripheral surface constituting pieces to enable expanding and contracting is rotationally drivenly supported and transferred, to positions for building of the inner liner, the chafer, the squeeze (the reference numerals 1, 4, 1c in FIG. 11), and the second transfer section 12, for transferring the drum transfer support base to respective building positions for first and second carcass plies (the reference numerals 6a, 6b in FIG. 11) and a ply intermediate tape (the reference numeral 6c in FIG. 11).

The first transfer section 11 and the second transfer section 12 are mounted so as to get out of position relative to each other on both sides of and in parallel to the rotational transfer device A, which serves to rotationally transfer the drum transfer support bases 10 to one sides of the both transfer sections 11, 12 to the other sides thereof to change the same in direction. Both of the first and second transfer sections 11, 12, respectively, are provided with pairs of travel rails 11a, 12a and guides 14 provided on undersides of lower base plates 13 of the drum transfer support bases 10 are fitted slidably onto the rails 11a, 12a. Also, transfer racks 11b, 12b are provided between the respective two rails 11a, 12a of the both transfer sections 11, 12 to extend along the travel rails 11a, 12a.

Motors 16 are mounted on support bodies 15 placed on the lower base plates 13, pinions 17 are connected to the motors 16 below the lower base plates 13, and the pinions 17 mesh with the racks 11b, 12b to rotate, whereby the drum transfer support bases 10 are propelled by the guides 14 to slidingly run on the rails 11a, 12a. The support bodies 15 include drive means (depiction of which is omitted) for drum rotation.

In addition, the drum transfer support bases are not limited to ones, which slidingly move on the rails, but include support carriage, which run on rails with wheels.

The rotational transfer device A comprises a rotating table 20 having an axis O intermediate between the first transfer section 11 and the second transfer section 12, which are arranged on both sides thereof, in particular, intermediate between extensions of the respective sections and having a region of rotation including extensions of both of the first and second transfer sections 11, 12.

The rotating table 20 is annular with a center thereof opened and provided on an underside thereof in the vicinity of an outer periphery thereof with a plurality of guides 21, which are spaced at intervals on a circle centering on the axis O, and the guides 21 are fitted slidably onto an annulus rail 23, which is mounted on a machine base 22 to center on the axis O, to enable rotating about the axis O in a horizontal state. For example, an outer rotor type drive motor 24 is mounted as drive means centrally of the machine base 22, a substantially rhombic-shaped drive plate 25 extending from an axis in opposite directions at 180 degrees as shown in FIG. 7 is mounted as a part of a power transmission mechanism on an upper portion of a rotor member (not shown) of the drive motor 24, and both ends of the drive plate 25 are connected and fixed to the rotating table 21 by means of fasteners such as bolts, nuts, etc. That is, the rotating table 20 is provided to be rotationally driven through the drive plate 25 by the motor 24, in particular, rotationally driven 180° by 180°. In operation, proximity switches 26, 26, etc. arranged close to the outer periphery of the rotating table 20 stop the motor 24, when being approached by convex pieces 26a, 26a provided in positions opposed at 180° on the rotating table 20, to control the rotating table 20 so as to make the same rotate alternately forward and backward 180° by 180°.

Rotating drive means for the rotating table 20 is not limited to one connected through the drive plate 25 to the drive motor 24 provided centrally of the machine base as shown in the figure but other various embodiments are possible, for example, a gear is made use of as a power transmission mechanism to enable the rotating table to be rotationally driven.

Two pairs of two rotational transfer rails 27a, 28a, which can be positioned corresponding to extensions of the travel rail 11a of the first transfer section 11 and of the travel rail 12a of the second transfer section 12 in a rotation stopped state, are juxtaposed on the rotating table 20 to be made in parallel to each other with the axis O therebetween, in particular, rotationally symmetrical at 180° with respect to the axis O.

Thereby, owing to rotation of the rotating table 20 about the axis O, the both rails 27a, 28a are positioned alternately corresponding to the travel rails 11a, 12a of both of the first and second transfer sections 11, 12 to receive the two drum transfer support bases 10, 10 entering from the travel rail 11a of the first transfer section 11 or the travel rail 12a of the second transfer section 12 to enable the same to rotationally transfer to the other transfer section 12 or 11 simultaneously.

Also, racks 27b, 28b are provided along the two pairs of rails 27a, 28a on the rotating table 20 to be positioned correspondingly to extensions of the rack 11b of the first transfer section 11 and the rack 12b of the second transfer section 12, and the pinions 17 provided on the drum transfer support bases 10 mesh with the racks 27b, 28b subsequent to the racks 11b, 12b to rotate whereby the drum transfer support bases 10 enter the rotating table 20 or are forwarded onto the first or second transfer sections 11, 12.

The reference numeral 30 in the figure denotes a proximity switches operatively opened or closed when the drum transfer support bases 10 enter predetermined positions and electric signals from the proximity switches 30 stop driving of the motor 16 through a control unit (not shown) to enable stopping transfer of the drum transfer support bases 10. Normally, similar proximity switches are arranged in respective building positions on the first transfer section 11 and the second transfer section 12 to control driving of the motor 16, thus enabling stopping the drum transfer support bases 10 in predetermined positions.

Also, stopper pins 29, respectively, are provided in the vicinity of the two pairs of rails 27a, 28a on the rotating table 20 to be capable of being fitted into engagement holes 18 provided on the lower base plates 13 of the drum transfer support bases 10, 10 having entered onto the respective rails 27a, 28a, and to be enabled by cylinder devices 29a to project upward, and the stopper pins 29 are fitted into the engagement holes 18 whereby the drum transfer support bases 10 received onto the rotating table 20 can be held in predetermined positions.

Further, a rotation restricting member 32 is provided on the machine base 22 outside the rotating table 20 to project toward and engage with an engagement 31, which is provided on the outer periphery of the rotating table 20, when rotation of the rotating table 20 is stopped, thereby restricting movements of the rotating table 20 in a direction of rotation to enable holding the respective travel rails 11a, 12a of both the first and second transfer sections 12 and the two pairs of rails 27a, 28a on the rotating table 20 in a state of being correspondingly positioned. In particular, the engagements 31 are provided in two positions opposed at 180° on the outer periphery of the rotating table 20 so as to correspond to the rotation restricting member 32 whenever rotation of the rotating table 20 is stopped 180° by 180° in forward and backward directions.

In the case in the figure, with the rotation restricting member 32, a rod-shaped body 32a, both sides of a tip end of which are cut out to be substantially rhombic-shaped, is positioned between extensions of the first transfer section 11 and of the second transfer section 12 and held to be enabled by a cylinder device 32b, which is connected to a rear end of the rod-shaped body 32a, to project toward the rotating table 20. On the other hand, the engagements 31 comprise two engagement members 31a, 31a provided in those positions on the outer periphery of the rotating table 20, which correspond to the rod-shaped body 32a when rotation of the rotating table 20 is stopped, at predetermined intervals in the direction of rotation, and a tip end 32c of the rod-shaped body 32a is fitted between the both engagement members 31a, 31a to thereby enable restricting rotation of the rotating table 20. In particular, opposed sides of the both engagement members 31a, 31a are formed to be tapered as shown in FIG. 10 so that a space K1 between the both sides corresponds to the substantially rhombic shape of the tip end 32c of the rod-shaped body 32a, and provided to enable the tip end of the rod-shaped body 32a to be readily fitted into the space K1 and to achieve the function of correcting a stop position of the rotating table 20.

In addition, with the embodiment shown in the figure, a cable Ca for operation of the building drums D1, the drum transfer support bases 10, the rotational transfer device A, etc. is dropped onto the rotating table 20 from above the rotational transfer device A to be connected to the respective constituent parts so as not to become an obstacle to rotational transfer of the drum transfer support bases 10, which is caused by rotation of the rotating table 20 in the forward and backward directions. The reference numeral 35 denotes a support member for the cable Ca, and 36 a cable feed, which holds a cable connected to the drum transfer support bases 10. The cable can be taken into a portion of the rotational transfer device A from under to be connected to the respective constituent parts. In this case, the support member 35 is dispensed with.

As described above, the invention is embodied by mounting the rotational transfer device A constructed in the above manner between the first transfer section 11, on which the building positions for winding and laminating rubber tire constituent members such as an inner liner, a chafer, a squeeze are set, and the second transfer section 12, on which the building positions for the tire constituent members such as carcass plies, a ply intermediate tape, etc. are set, in a process, in which a cylindrical-shaped carcass band is built. At this time, predetermined tire constituent members can be laminated and built on the both transfer sections 11, 12 at the same time while one of the two drum transfer support bases 10, 10 each supporting the building drum D1 is sequentially shifted to the second transfer section 12 from the first transfer section 11 and the other is sequentially shifted to the first transfer section 11 from the second transfer section 12. An explanation will be given to the work of building and the shifting motions of the drum transfer support bases 10.

At the time of normal building, one of the two drum transfer support bases 10, 10 is disposed on the first transfer section 11, the other is disposed on the second transfer section 12, and winding and building are performed every tire constituent member set to each of the both transfer sections 11, 12 in the following manner.

First, when transfer begins, in the first transfer section 11, the pinion 17 meshing with the rack 11b along the travel rail 11a is rotated by the motor 16 whereby predetermined tire constituent members, that is, rubber members such as an inner liner, a chafer, a squeeze, etc. are wound round, laminated and built on the building drum D1 while the drum transfer support base 10 is sequentially transferred to respective building positions along the travel rail 11a. At this time, the rotating table 20 of the rotational transfer device A is put in a state, in which rotation is stopped, and the two pairs of rails 27a, 28a on the rotating table 20 correspond to the travel rails 11a, 12a of both of the first and second transfer sections 11, 12.

When laminating and building of predetermined tire constituent members in the respective building positions in the first transfer section 11 are terminated, the drum transfer support base 10 is caused by rotation of the pinion 17 to enter onto portions of the rails 27a on the rotating table 20 of the rotational transfer device A from portions of the travel rails 11a to stop in a predetermined position. At the same time, the stopper pin 29 is caused by the operation of the cylinder device 29a to project upward to be fitted into the engagement hole 18 provided on the lower base plate 13 of the drum transfer support base 10. Thereby the drum transfer support bases 10 are held so as not to move arbitrarily.

In the held state described above, the drive motor 24 of the rotational transfer device A is driven to rotate the rotating table 20 by 180° in one of the forward and backward directions whereby the drum transfer support base 10 is rotationally transferred to a position corresponding to the second transfer section 12 to be changed in direction. At this time, the drum transfer support base 10 disposed in the second transfer section 12 also enters portions of the rails 28a and held in the same manner as described later to be rotationally transferred at the same time to a position corresponding to the first transfer section 11 reversely to the manner described above.

When the rotating table 20 is rotated by 180°, this is detected by the proximity switch 26 to stop rotation and further the rod-shaped body 32a of the rotation restricting member 32 provided outside the rotating table 20 is caused by the operation of the cylinder device 32b to project, so that the tip end 32c thereof is fitted into the engagement 31 provided on the outer periphery of the rotating table 20, that is, the space K1 between the two engagement members 31a, 31a to hold the rotating table 20 in a stopped state. Thereby, the two pairs of rails 27a and the rack 27b, respectively, on the rotating table 20 are exactly positioned corresponding to the travel rails 12a and the rack 12b in the second transfer section 12. At the same time, the other rails 28a and the other rack 28b are positioned corresponding to the travel rails 11a and the rack 11b in the first transfer section 11.

In this state, after the stopper pin 29 is caused by the operation of the cylinder device 29a to be extracted downward from the engagement hole 18, the pinion 17 meshing with the rack 27b along the rail 27a rotates to forward the drum transfer support base 10 onto the travel rails 12a in the second transfer section 12 from portions of the rails 27a.

Then, while the drum transfer support base 10 is sequentially moved to the respective building positions along the rails 12a, predetermined tire constituent members, that is, members such as carcass plies, a ply intermediate tape, etc. are wound round, laminated and built on the rubber members, such as the inner liner, etc., laminated and built on the building drum D1. Thereby, a cylindrical-shaped carcass band is built on the building drum D1.

When building is completed thus, the drum transfer support base 10 is caused by rotation of the pinion 17 to enter onto portions of the rails 27a on the rotating table 20 of the rotational transfer device A put in a stopped state from portions of the travel rails 12a to stop in a predetermined position, and the stopper pin 29 is caused to be fitted into the engagement hole 18 provided on the lower base plate 13 of the drum transfer support base 10 to be held against movement in the same manner as described above.

Also, at this time, the drum transfer support base 10, on which laminating and building of the tire constituent members are completed in the first transfer section 11, enters portions of the rail 28a positioned corresponding to the first transfer section 11 to be held as described above.

Hereupon, in the held state described above, the drive motor 24 of the rotational transfer device A is driven to rotate the rotating table 20 by 180° in the other of the forward and backward directions reversely to the manner described above whereby one of the drum transfer support bases 10 on the rails 28a is rotationally transferred to a side of the second transfer section 12 from a side of the first transfer section 11 and at the same time, the drum transfer support base 10 on the rails 27a corresponding to the second transfer section 12 is rotationally transferred to a position corresponding to the first transfer section 11 to be changed in direction.

In this state, after the stopper pin 29 is extracted downward from the engagement hole 18, rotation of the pinion 17 meshing with the rack 27b causes the drum transfer support base 10 to be forwarded onto the travel rails 11a in the first transfer section 11 from portions of the rails 27a and moved to a position of first transfer means C1 as it is, the building drum D1 is contracted in diameter, and the cylindrical-shaped carcass band on the building drum D1 is held from an outer peripheral side thereof by the first transfer means C1 to be extracted from the building drum D1 and transferred to a second building stage S2 subsequent thereto.

Thereafter, predetermined tire constituent members are laminated and built on the building drum D1 in the first transfer section 11 in the same manner as described above while the drum transfer support base 10 is sequentially moved to the respective building positions along the travel rails 11a. Also, the drum transfer support base 10 on the rails 28a is forwarded onto the travel rails 12a of the second transfer section 12 and predetermined tire constituent members are laminated and built on those rubber members, which are laminated and built on the building drum D1 in the first transfer section 11, in the second transfer section 12 in the same manner as described above while the drum transfer support base 10 is sequentially moved to the respective building positions along the travel rails 12a.

In this manner, predetermined tire constituent members can be sequentially laminated and built in the both transfer sections 11, 12 while one of the two drum transfer support bases 10, 10 is shifted sequentially to the second transfer section 12 from the first transfer section 11 and the other is shifted sequentially to the first transfer section 11 from the second transfer section 12, so that it is possible to increase building of a carcass band in efficiency, thus enabling considerably shortening time for building.

In addition, the rotational transfer device of the invention can also be constructed and embodied so that while not shown, in a belt building process, in which a cylindrical-shaped belt/tread band composed of a belt and a tread rubber is built, a first transfer section, in which a plurality of building positions including a position for winding and laminating of a belt member composed of a plurality of layers are set, and a second transfer section, in which a building position for winding and laminating of a rubber member for formation of tread rubber is set, are divided, and the same rotational transfer device as described above is arranged between the both transfer sections to alternately transfer two drum transfer support bases, on which building drums for belt building are supported, to the both first and second transfer sections. Also, in this case, a plurality of belt members, tread rubber, etc. can be efficiently laminated and built in parallel in the both transfer sections, so that it is possible to increase building of a belt/tread band in efficiency.

In the belt building process, building positions for winding and laminating of a rubber member such as tread rubber, etc. include the case where a wide rubber member formed into a predetermined cross sectional shape, which is the same as in a conventional art, is stuck and laminated.

INDUSTRIAL APPLICABILITY

The invention can be preferably made use of in a building process, in which a green tire before curing is built, in particular, a process, in which a cylindrical-shaped carcass band is built, or a process, in which a cylindrical-shaped belt/tread band is built, or the like.

BRIEF DESCRIPTION OF THE DRAWINGS

FIG. 1 is a view schematically showing a part of a tire building process, in which a rotational transfer device according to the invention is adopted.

FIG. 12 is a view illustrating a cross section of a tire structure.

DESCRIPTION OF REFERENCE NUMERALS AND SIGNS

Figure 2:
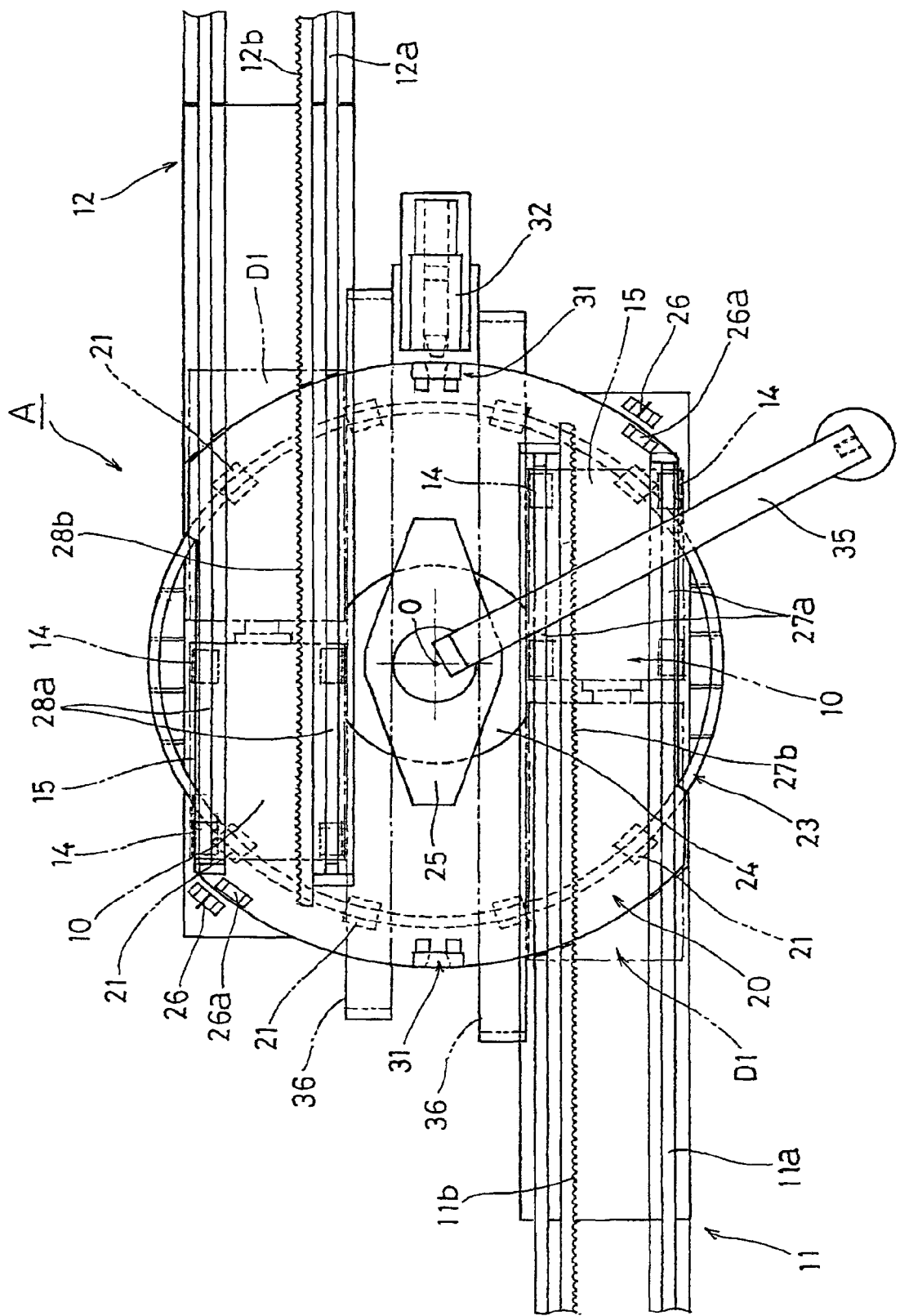
FIG. 2 is a plan view showing a rotational transfer device according to an embodiment of the invention.
Figure 3:
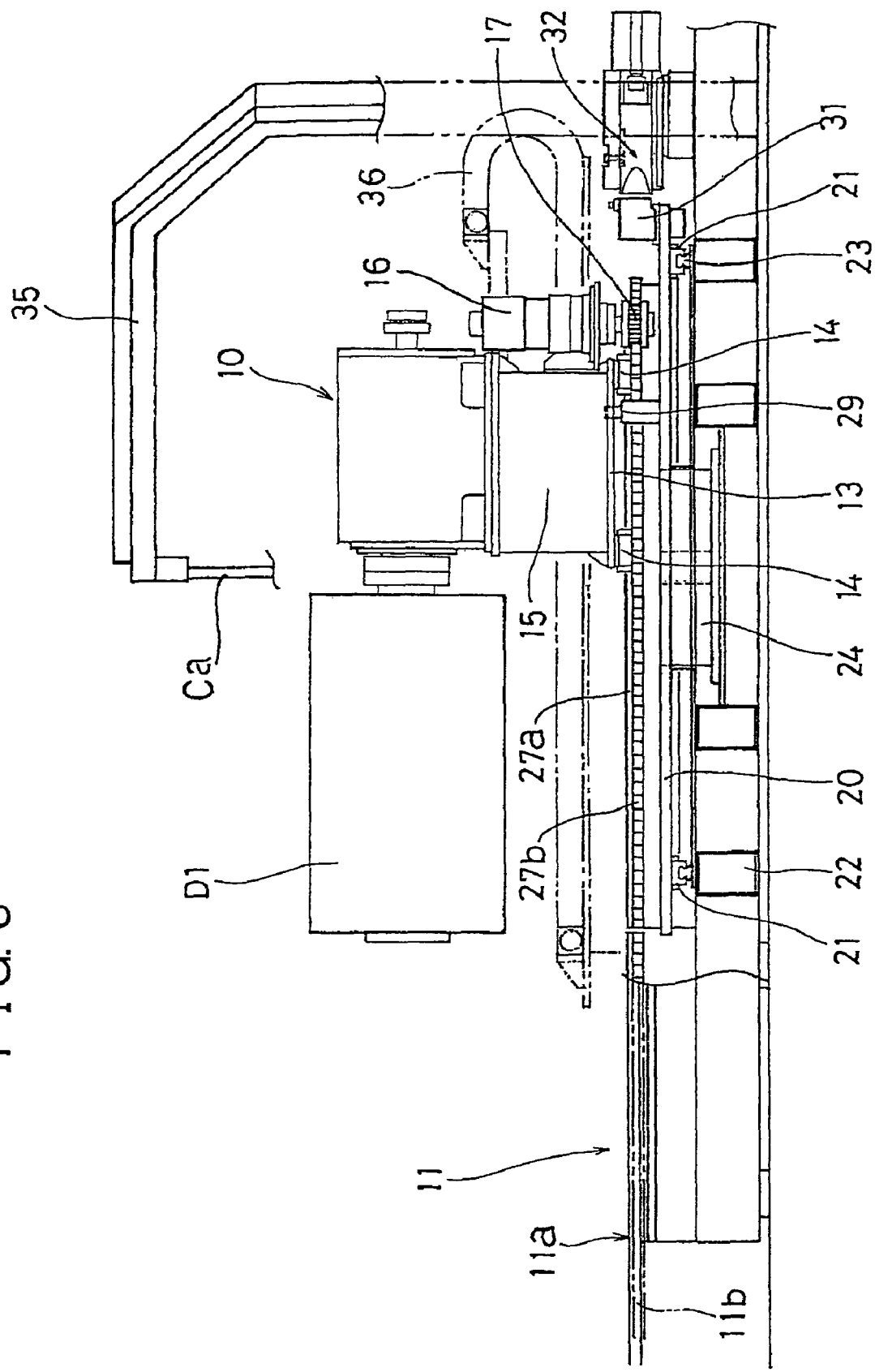
FIG. 3 is a front view showing the rotational transfer device.
Figure 4:
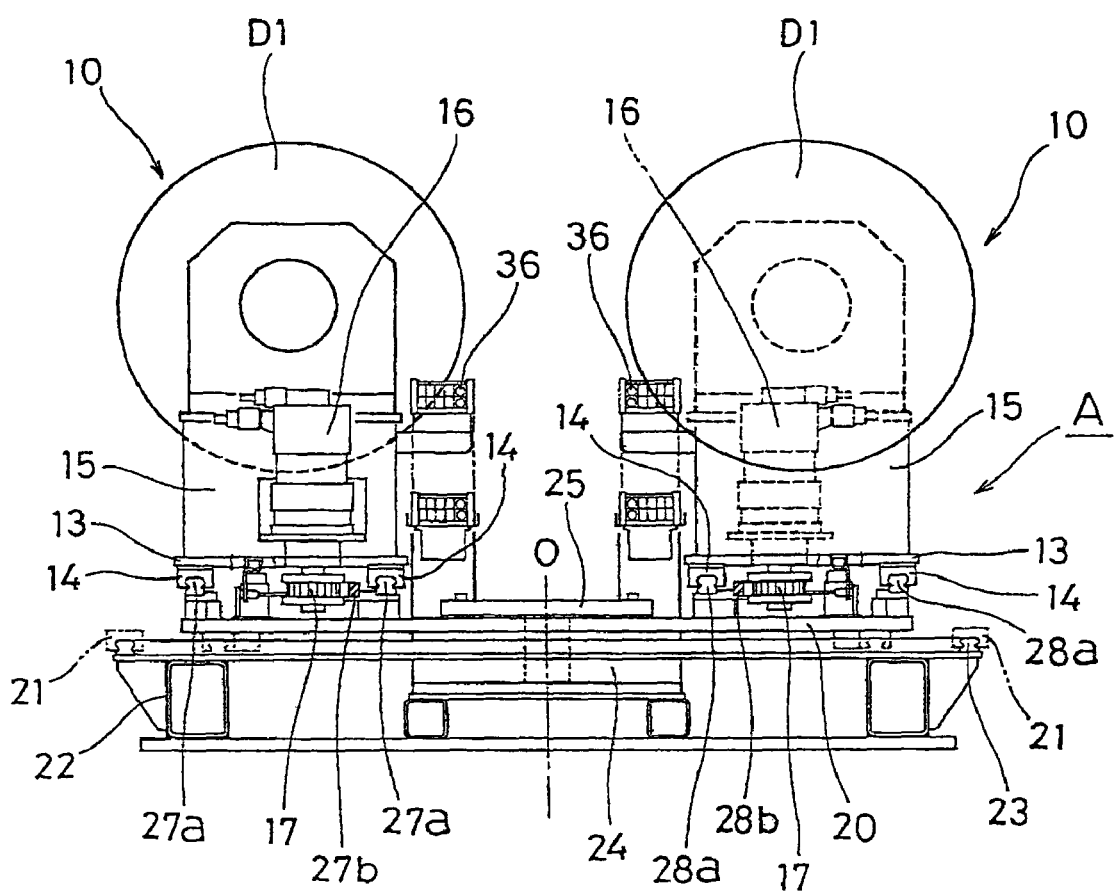
FIG. 4 is a side view showing the rotational transfer device.
Figure 5:
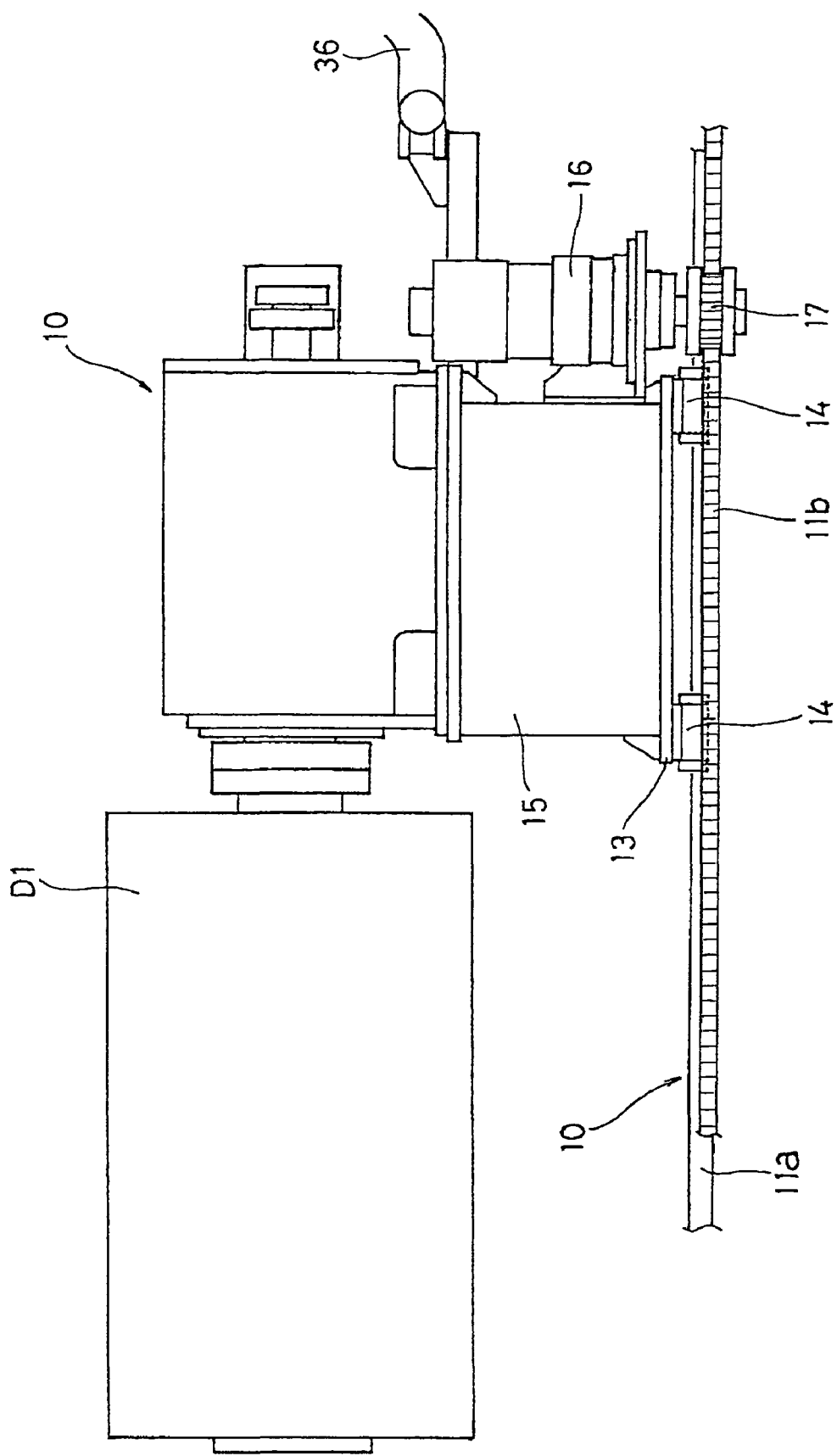
FIG. 5 is a front view showing a drum transfer support base, which is an object being transferred.
Figure 6:
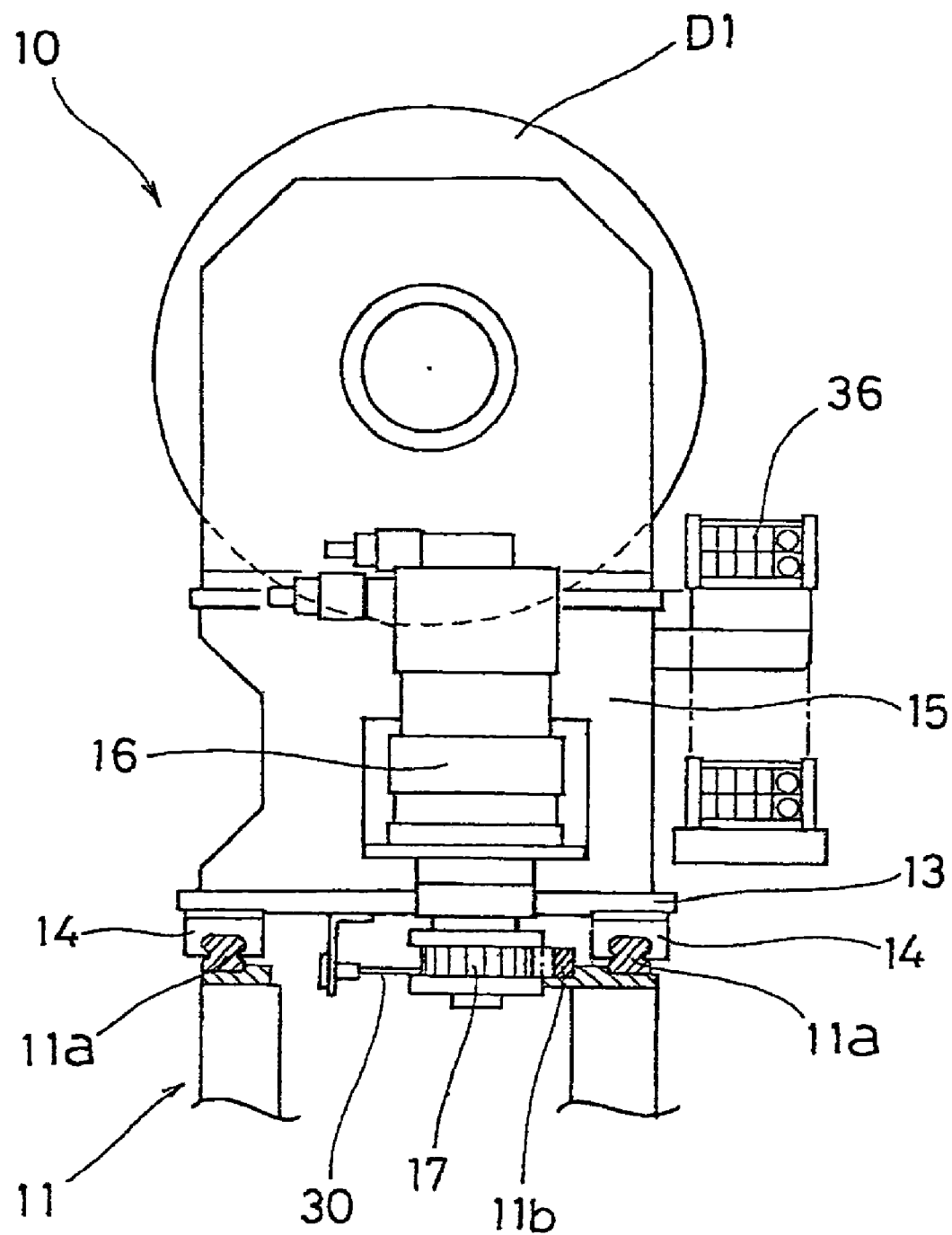
FIG. 6 is a side view showing the drum transfer support base.
Figure 7:
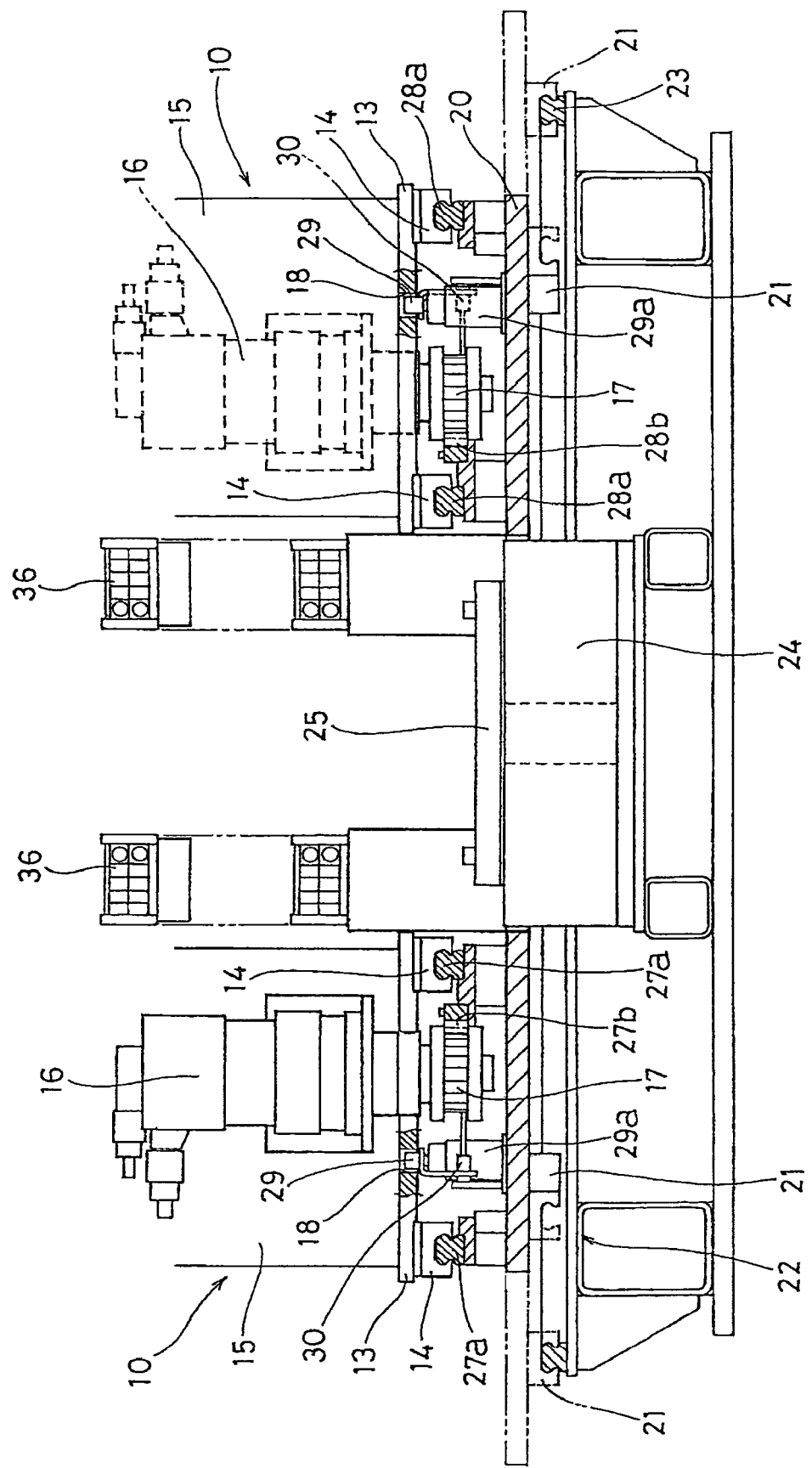
FIG. 7 is a cross sectional view showing, in enlarged scale, a part of a rotating table of the rotational transfer device.
Figure 8:
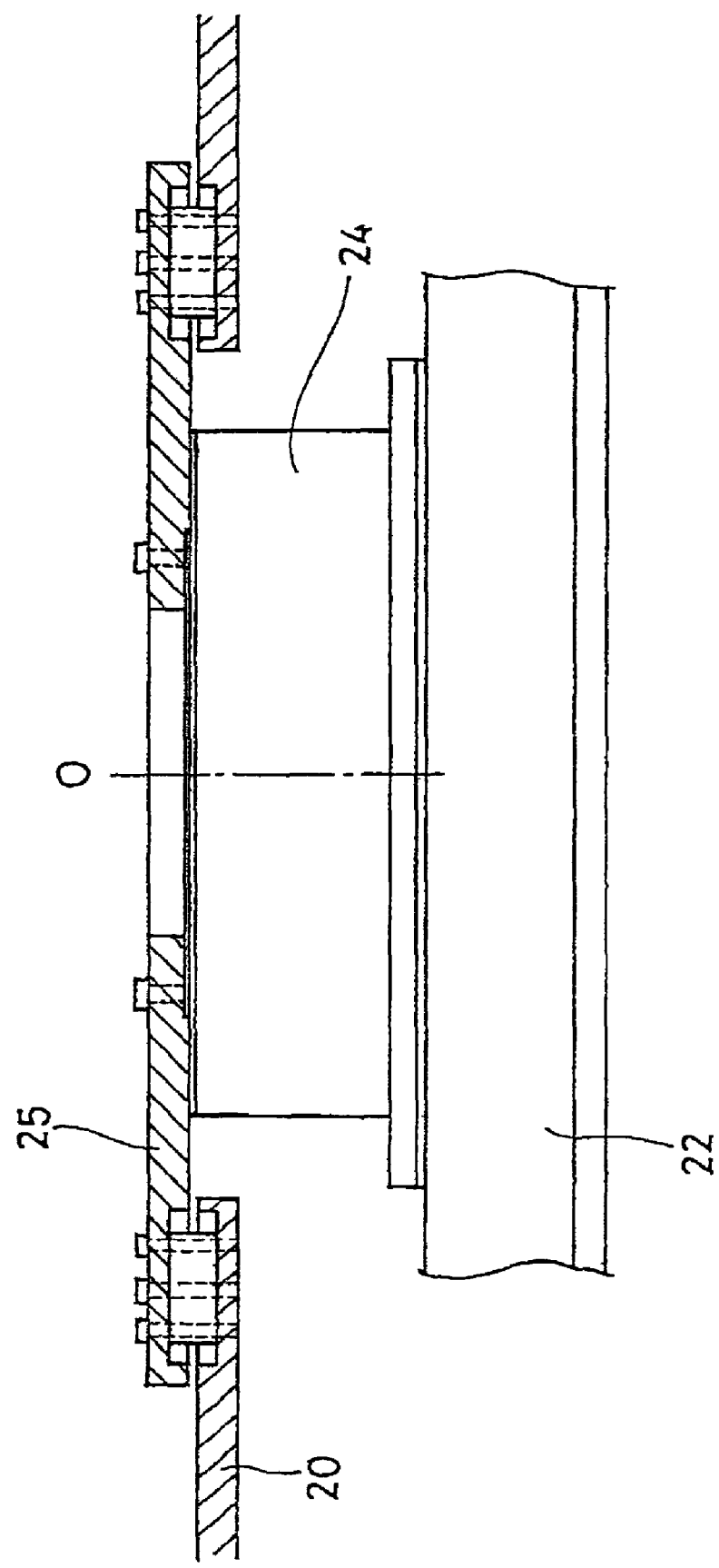
FIG. 8 is a cross sectional view showing, in enlarged scale, a part of a drive plate, by which the rotating table is rotationally driven.
Figure 9:
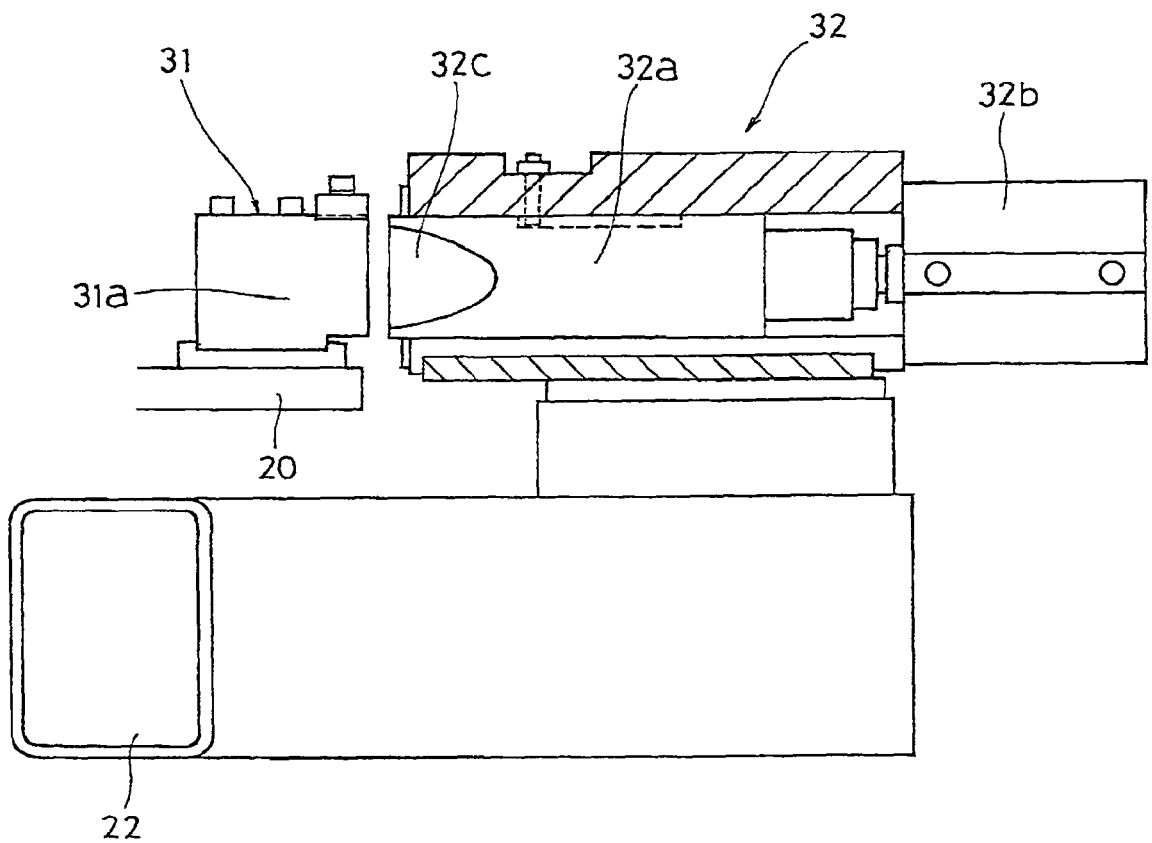
FIG. 9 is a cross sectional view showing, in enlarged scale, a part of a rotation restricting member for the rotating table.
Figure 10:
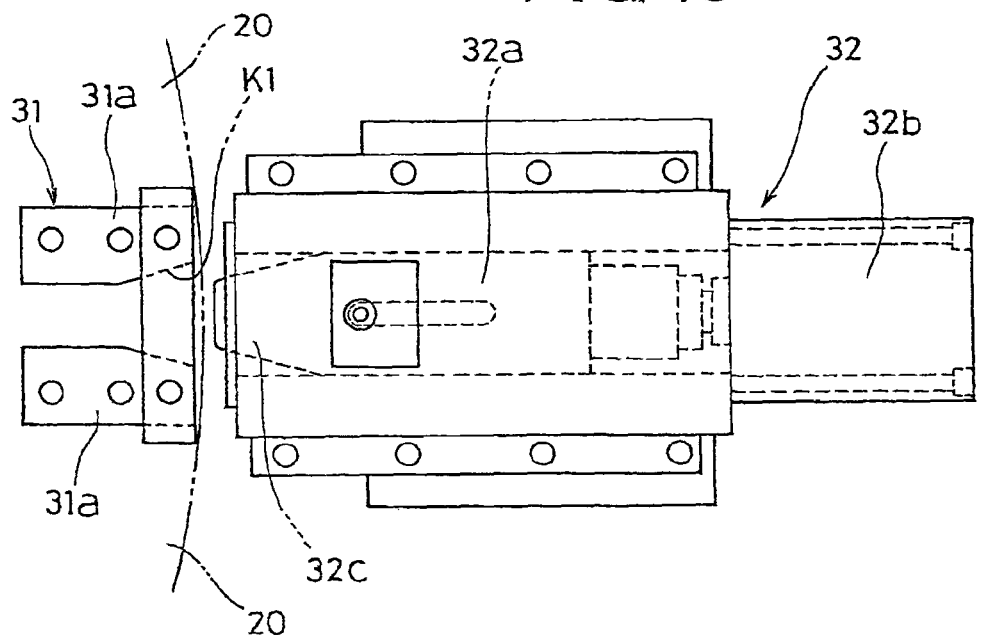
FIG. 10 is a plan view showing the part of the rotation restricting member.
Figure 11:
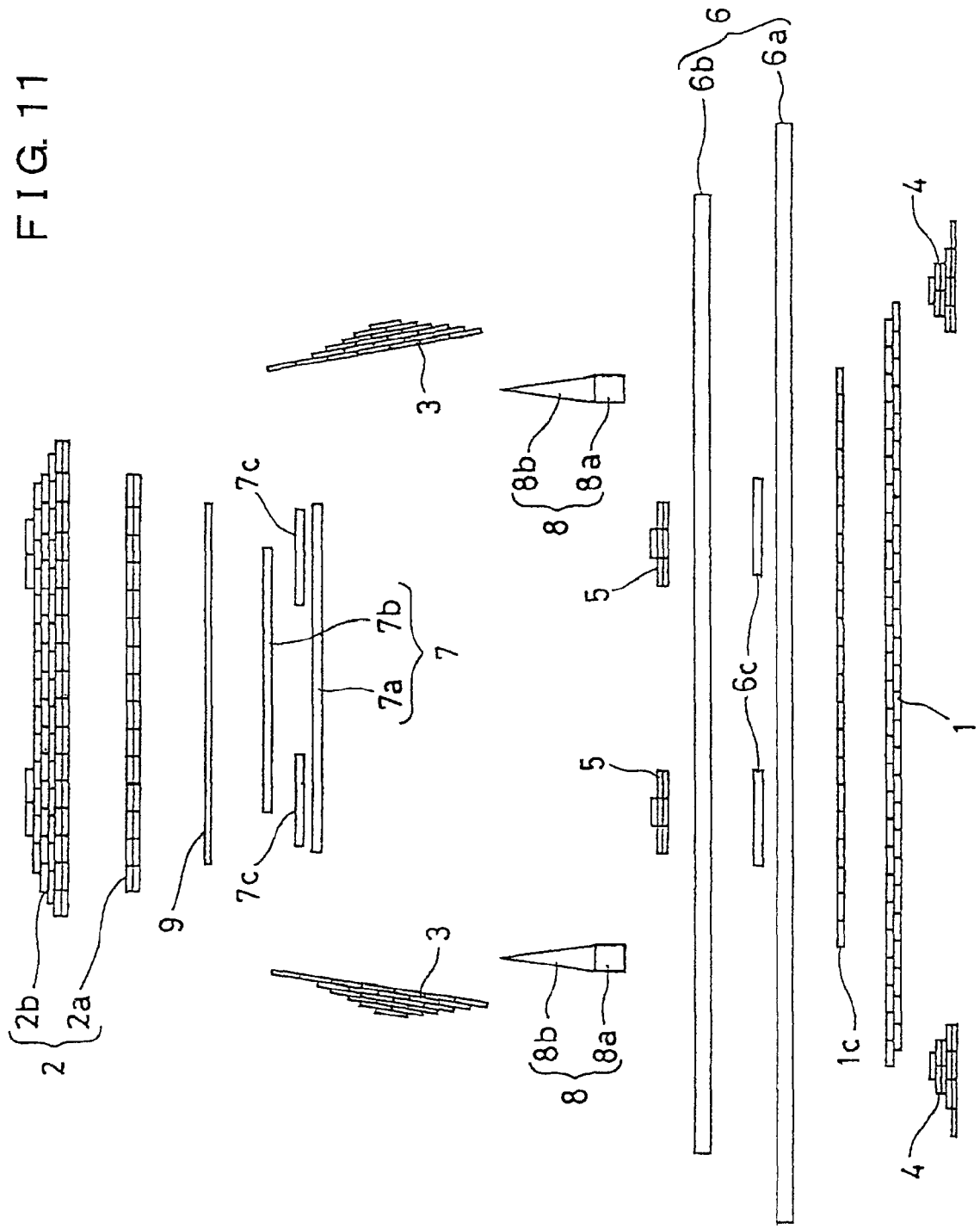
FIG. 11 is a view schematically illustrating an example of respective constituent members of a tire in an exploded manner.

A: rotational transfer device, D1: building drum, E1, E2, E3: extruder, T: tire, Ca: cable, O: axis, 1: inner liner, 2: tread, 3: sidewall, 4: chafer, 5: belt under pad, 6: carcass layer, 7: belt layer, 8: bead body, 9: reinforcement tape, 10: drum transfer support base, 11: first transfer section, 12: second transfer section, 11a, 12a: travel rail, 11b, 12b: rack, 13: lower base plate, 14: guide, 15: support body, 16: motor, 17: pinion, 18: engagement hole, 20: rotating table, 21: guide, 22: machine base, 23: annulus rail, 24: drive motor, 25: drive plate, 26: proximity switch, 27a, 28a: rotational transfer rail, 27b, 28b: rack, 29: stopper pin, 29a: cylinder device, 30: proximity switch, 31: engagement, 31a, 31a: engagement member, 32: rotation restricting member, 32a: rod-shaped body, 32b: cylinder device, 32c: tip end, K1: space, 35: support member for cable, 36: cable feed

The invention claimed is:

1. A tire building method, wherein in a part of a process of tire building,
   two drum transfer support bases which rotatably support respective building drums are used;
   a first transfer section setting a building position of at least one tire constituent member, and a second transfer section setting a building position of at least one tire constituent member, and in which sections each drum transfer support base transfers in a linear direction from a rotational transfer device to a plurality of building positions, are provided substantially parallel to, but axially offset from, each other and are longitudinally displaced from each other;
   the rotational transfer device is interposed between one end of the first transfer section and an end of the second transfer section closest to said one end of the first transfer section;
   the following first process and second process are simultaneously conducted;
   first process: in the first transfer section, one drum support base is transferred linearly to each of the respective building positions, and a rubber material is successively wound around a drum in each building position of the first transfer section, thereby building respective tire constituent members;
   second process: in the second transfer section, another drum support base is transferred linearly to each of the respective building positions, and a rubber material is successively wound around a drum in each building position of the second transfer section, thereby building respective tire constituent members; and
   the following third process and fourth process are simultaneously conducted;
   third process: the one drum transfer support base after completion of the winding in the first transfer section in the first process is rotated 180° through the rotational transfer device, and at the same time, is transferred to the second transfer section;
   fourth process: the other drum transfer support base after completion of the winding in the second transfer section in the second process is rotated 180° through the rotational transfer device, and at the same time, is transferred to the first transfer section.

2. The tire building method according to claim 1, which further conducts a fifth process of transferring the other drum transfer support base transferred to the first transfer section to a position of a conveying means in the fourth process, reducing a diameter of the building drum, extracting a cylindrical band on the building drum from the building drum by holding it from the outer periphery thereof, and transferring the cylindrical band to a subsequent building stage.

* * * * *